United States Patent [19]
Reim et al.

[11] 3,848,135
[45] Nov. 12, 1974

[54] RADIATION SOURCE HOLDER
[75] Inventors: Thomas E. Reim, Willowick; Jerry J. Pollack, Brookpark; Robert A. Kemmerling, Cleveland, all of Ohio
[73] Assignee: Republic Steel Corporation, Cleveland, Ohio
[22] Filed: Oct. 29, 1970
[21] Appl. No.: 85,247

Related U.S. Application Data
[62] Division of Ser. No. 720,057, April 10, 1968, abandoned.

[52] U.S. Cl. .................................. 250/496, 250/360
[51] Int. Cl. .............................................. G21h 5/00
[58] Field of Search . 250/43.5 D, 43.5 MR, 83.3 D, 250/83.6 S, 106 S

[56] References Cited
UNITED STATES PATENTS
2,781,453   2/1957   Belcher et al. ................. 250/83.6 S
3,143,886   8/1964   Lippke ...................... 250/83.3 D X
3,546,456   12/1970  Grice .......................... 250/83.6 S X

OTHER PUBLICATIONS

Radioactivity–and Density–Measuring Devices for Oceanographic Studies, by C. M. Bunker, from Geological Survey Research, 1964, pp. D65–D69.

Primary Examiner—Archie R. Borchelt
Attorney, Agent, or Firm—Cooper, Dunham, Clark, Griffin & Moran

[57]                ABSTRACT

A plow for holding the radioactive source is employed. The plow has a wedge-shaped forward portion and a forwardly extending prow which serve to direct the granular material past and below the plow.

1 Claim, 6 Drawing Figures

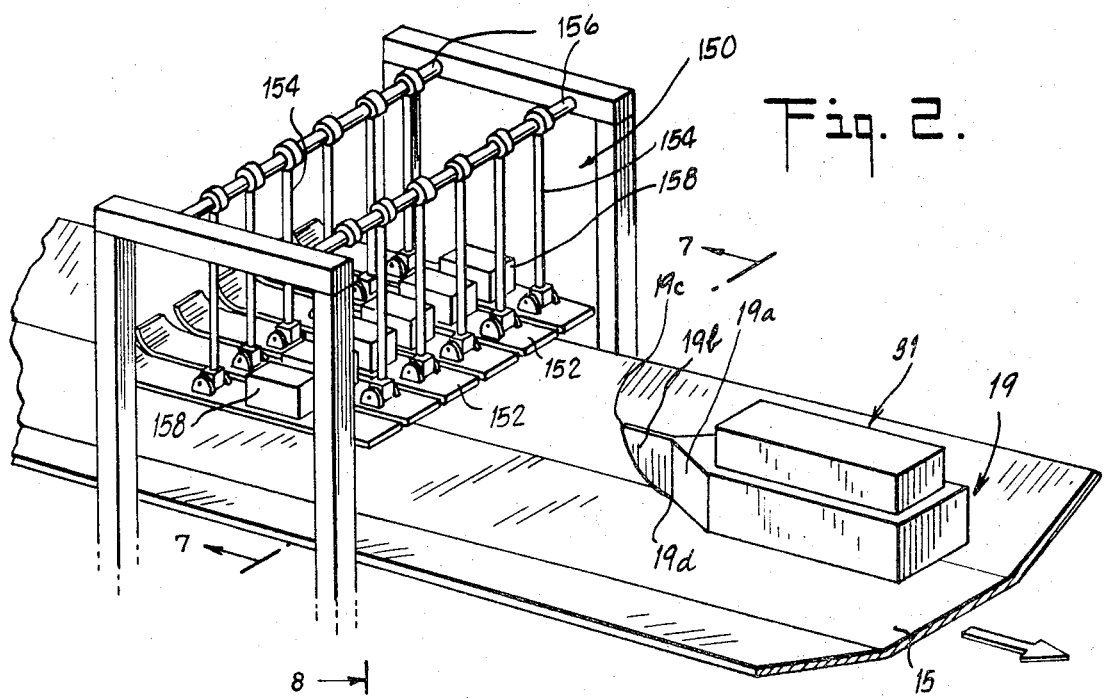
Fig. 2.
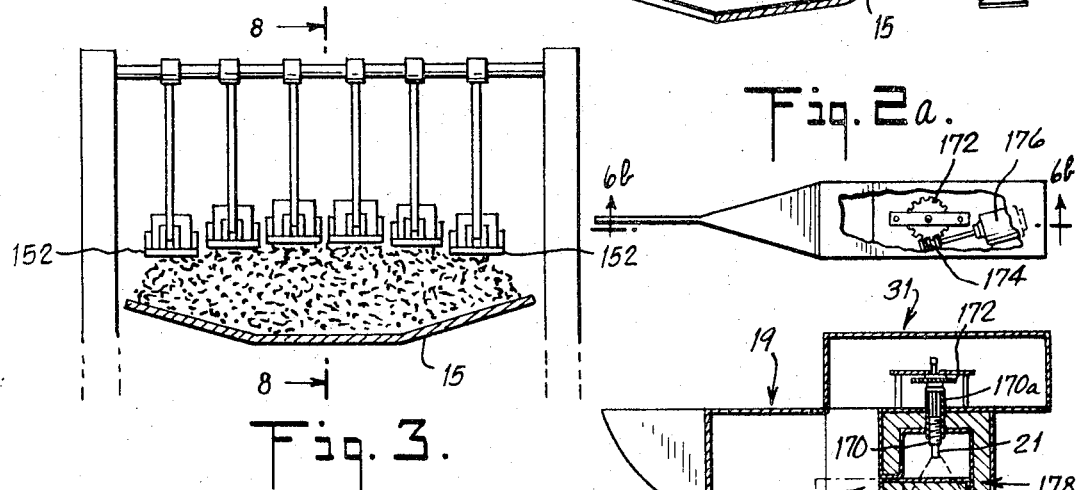
Fig. 3.
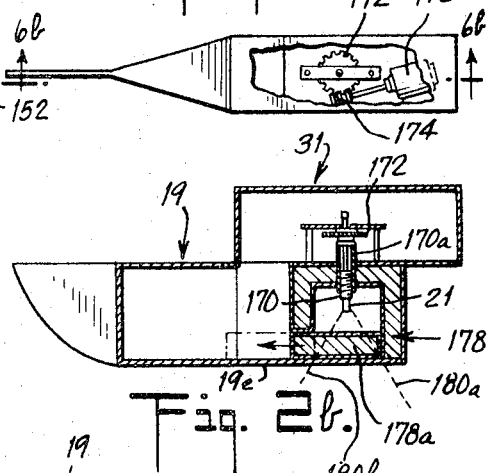
Fig. 2a.
Fig. 2b.
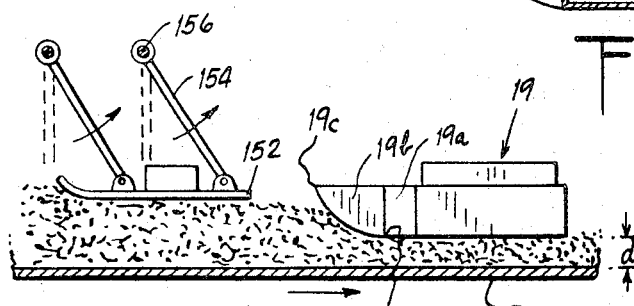
Fig. 4.

3,848,135

RADIATION SOURCE HOLDER

CROSS REFERENCE TO RELATED APPLICATION

This application is a division of our co-pending Application Ser. No. 720,057, filed Apr. 10, 1968, now abandoned, for "Bulk Density Gage and Bulk Density Control System."

BACKGROUND OF THE INVENTION

This invention relates to measuring and controlling the bulk density of granular material. It has particular application to the measurement and control of the bulk density of coal in a coke oven charging system.

BRIEF DESCRIPTION OF THE INVENTION

This invention finds use with a radioactive source for directing radiation through a moving stream of granular material, e.g., coal, and a radiation detector for measuring the amount of radiation passing through the material. In its preferred embodiment, this invention comprises a plow for leveling coal on a belt carrying the coal to a coke oven.

The invention will appear more fully in the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings, like reference numerals indicate like parts, and

FIG. 2 is a perspective view of a sled assembly for varying the bulk density of coal to simulate a drop in an oven and a plow for mounting a source of radiation, the latter in accordance with the present invention;

FIG. 2a is a top view of the plow shown in FIG. 2, broken away in part to show some details inside the plow;

FIG. 2b is a sectional view of the plow of FIG. 2a, taken along the section line 6b—6b of FIG. 2a;

FIG. 3 is a sectional view of the apparatus shown in FIG. 2, taken along the section line 7—7 of FIG. 2;

FIG. 4 is a sectional view of the apparatus of FIG. 3, taken along section line 8—8 of FIG. 3.

DETAILED DESCRIPTION

Figure 1:
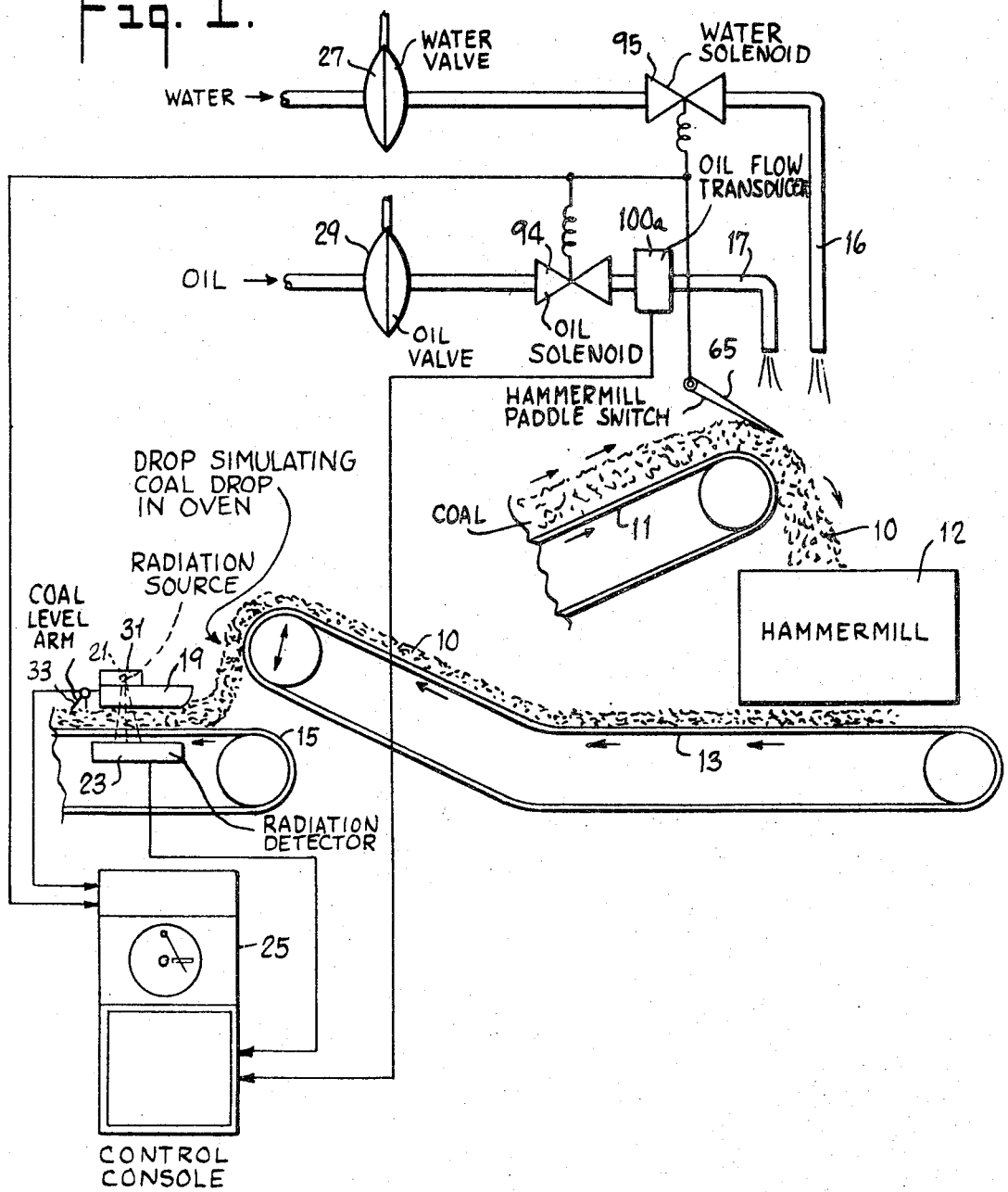
FIG. 1 is a generalized diagrammatic view of principal components of a representative system incorporating the present invention.

A familiarity with the essential features of a system in which the invention is employed can be obtained by reference to FIG. 1 in which the invention has been diagrammatically shown as incorporated in a system for handling coal prior to charging the coal into a coke oven battery. The coal is received at the coke battery site as it comes directly from a mine, storage bins, or a stockyard. A mixture of different coals 10 is delivered on a conveyor belt 11 to a conventional hammermill 12 which crushes the coal and reduces it to a relatively uniform particle coal size. Thereafter, in the particular coal handling system shown, a conveyor 13 transports the coal to and drops it onto a conveyor belt 15 which carries it to the coking ovens.

To achieve a desired operation of the coke oven battery, the coal stream 10 must be maintained at a substantially uniform desired bulk density. Usually, the bulk density desired is the maximum bulk density consistent with safe oven pressures and is normally a bulk density above the minimum density that can be achieved by addition of water to the coal used. The coal received at the hammermill 12 varies widely in bulk density and the bulk density is changed at that point to a desired uniform level by the addition to the coal of small amounts of water from a pipe 16 to decrease the bulk density within certain limits, and oil from a pipe 17 to increase the bulk density within certain limits.

To measure and control the bulk density of the coal stream 10, in accordance with the presently preferred embodiment of this invention, a system is used in which the coal stream 10 is leveled and the stream of coal is reduced to a uniform thickness by a plow 19 as the conveyor 15 carries the coal forward. The bulk density of the leveled coal stream is measured, and means responsive to the measurement of the bulk density causes the selective addition of oil and water to coal to maintain the density of the coal stream 10 within a predetermined bulk density range. To this end, the coal on the belt 15 is leveled by the plow 19 to produce a level, substantially freely piled longitudinally extending coal stream. The leveling step has the result of efficiently keeping the freely piled solid material in the stream sufficiently leveled to make possible the measurement and control of the bulk density of the coal stream by means of a radioactive source and detector. The details of the plow 19 which provide a parting of the coal past the plow and a leveling of the coal without the "hanging up" of the coal on the plow and without the plow catching foreign articles such as wire and the like in the coal, will be described later in connection with FIG. 2.

Prior to the leveling of the coal, the coal is dropped from the conveyor 13 onto the conveyor 15. The height of the drop, which is adjustable by adjustment of the height of conveyor 13 over conveyor 15, is made substantially the same as the drop the coal undergoes in the coke oven. Thus the coal is presented to the plow 19 and is conditioned substantially the same as it is in the oven just prior to combustion. This coal handling procedure is important, since it has been found that effective bulk density control is impossible to achieve without conditioning the coal beforehand to simulate its condition in use. Any drops occurring at other transfer points in the conveying system up to the plow 19 have no effect, since the bulk density of the coal at any given point in the system is dependent only on the height of the last drop which the coal has undergone. Specifically, when coal falls in a drop, the particles separate, thus erasing any previous drop history. Thus successive drops do not produce additive increases in bulk density. The drop provided from the conveyor 13 to the conveyor 15 just prior to plow 19 thus provides a proper conditioning of the coal at the zone in which bulk density is detected. It should be noted at this point, however, that in the event a conveying system cannot be adapted to provide a drop the same as the drop that the coal undergoes in an oven, the drop may be simulated by apparatus to be described later particularly with respect to FIGS. 2 to 4.

Rays from a fixed predetermined substantially constant strength of radiation from a radioactive source 21 are directed through the level coal stream to a detector 23 on the opposite side of the coal stream and at a fixed distance from the radiation source 21. The detector 23 produces a signal proportional to the radiation passing through the coal stream, and the signal is fed to a measuring, recording and controlling means 25. The recorder-controller 25 measures the bulk density of the coal stream on the basis that the signal thereto is proportional to the bulk density of the coal stream; and the recorder-controller responds to the measurement of the bulk density to actuate valves 27 and 29 to add water and/or oil selectively to the coal fed to the hammermill 12, so as to control the bulk density of the coal stream to a predetermined substantially constant amount.

Various types of radiation sources may be used, including gamma ray emitting radioisotopes such as cesium 137 or radium. For example, the radiation source 21 may comprise a pellet of radium.

The radiation source 21 produces rays of sufficient strength to penetrate the coal stream 10 and the belt 15, so as to produce a signal from the detector 23 proportional to the radiation passing through the coal stream and the belt. A container 31 holds the source 21, and the container is adjustably supported above the coal stream on the conveyor. The rays of energy from the source 21 are made to irradiate a predetermined portion of the stream.

The detector 23 is located on the side of the coal stream 10 opposite the pellet and at a fixed distance from the pellet 21, so as to receive radiation directed through the coal stream 10 and the belt 15 and to produce an electrical signal corresponding in intensity to the radiation reaching the detector 23. To this end, the detector 23 may be a plurality of Geiger-Müller tubes, a scintillation counter or similar conventional apparatus.

Gamma radiation from the pellet 21 is attenuated as the radiation passes through the coal in the coal stream and through the belt and this attenuation, or absorption, is a function of the density of the material between the radiation source and the detector. Since a predetermined portion of the stream is irradiated, and since the coal leveling means 19 causes the thickness of this portion of the coal stream to be substantially constant, the absorption of the gamma rays is a function of the bulk density of the coal stream 10. Thus, the detector 23 is exposed to the variable radiation field produced by changes in the bulk density of the coal stream.

The detector 23 generates a pulse signal, the pulse repetition rate of which is representative of the bulk density of the coal within the stream. The pulse signal is acted upon in the control console 25 throughout a plurality of successive counting cycles. In particular, in each counting cycle, a predetermined range of counts is taken as representing a range of bulk densities within which control of the bulk density may be effected. As an example only, this predetermined range of counts may encompass from 1,246,208 to 1,375,232 pulses counted, representing a coal bulk density variation of from 65 to 43 pounds per cubic foot. Within this range of bulk densities a preestablished sub-range of from 43 to 53 pounds per cubic foot, for example, is considered "normal." Such a "normal" sub-range of bulk densities may be represented by a pulse count in a counting cycle falling between 1,310,720 and 1,375,232. As long as in each counting cycle the number of pulses counted falls within this preestablished sub-range, the oil and water addition rates at the hammermill 12 are varied in accordance with the count. Specifically, if a low count in a cycle is detected, representing a relatively high bulk density close to 53 pounds per cubic foot, for example, the rate of water addition is increased by suitable actuation of the water valve 27, and oil addition is decreased by actuation of valve 29. If a high count in a cycle is detected, on the other hand, representing a relatively low bulk density near 43 pounds per cubic foot, for example, the rate of oil addition is increased by actuation of the oil valve 29 and water addition is decreased.

If the pulse count falls outside of the preestablished sub-range of counts, indicating a variation of the bulk density from the "normal" range, the mode of control is changed. In the example above, the predetermined range of counts was indicated as varying from 1,246,208 to 1,375,232 pulses. This predetermined range thus encompasses the range of "normal" densities as well as other, higher bulk densities. For example, the range of bulk densities represented by pulse counts from 1,246,208 to 1,310,720 may represent a coal bulk density variation from 65 to 53 pounds per cubic foot. This is considered a relatively high bulk density, although one which lends itself to control. Accordingly, if the pulse count is within this range, the oil valve 29 is shut off, discontinuing the supply of oil to the coal. Water is increased by suitable control of the water valve 27 until either a maximum rate of water addition is achieved or until, in a subsequent cycle, the bulk density returns to the "normal" range.

In the event that the pulse count is outside the predetermined range of counts, e.g., outside the range of pulse counts 1,246,208 to 1,375,232, an abnormal condition is considered to exist and all water and oil additions are discontinued.

A coal level arm 33 is mounted on the rear of the plow 19 and senses the proper level of coal in the stream 10 on the conveyor 15, sending a signal to the control circuits 25 if the proper level is lost. If the proper coal level is lost at the coal level arm, the oil flow to the coal from the pipe 17 is discontinued as by suitable actuation of the oil valve 29. Similarly, a hammermill paddle switch 65 positioned just in front of the hammermill 10 detects the application of coal to the hammermill. If the switch arm drops, indicating a discontinuance of coal supply to the hammermill, a signal is developed which is applied to the control console 25 for control purposes. Additionally, the signal causes the immediate closure of the water solenoid 95 and the oil solenoid 94 to discontinue all application of oil and water to the coal.

From FIG. 1 it will be noted that an oil flow transducer 100a is positioned in the oil pipe 17 to provide a signal to the control console 25 representative of the flow of oil to the coal for purposes of bulk density regulation. Within the control console this signal is utilized to control the addition of water to the pipe 16. To elaborate, as long as the control console is counting pulses in each cycle indicating a "normal" bulk density of from 43 to 53 pounds per cubic foot, for example, the system operates to ensure that oil flow is within a desired range. Specifically, if the rate of oil addition to the coal exceeds an upper limit, the water rate is decreased. If the oil rate is below a lower limit, on the other hand, the water rate is increased. In this fashion, the rate of oil addition is taken as a primary control which is to be established within a certain desired range. The rate of water addition is either increased or decreased, as the case may be, when the oil rate is outside the desired range so as to bring the oil rate within the desired range. Otherwise, the water and oil rates are both varied in each counting cycle so that they are increased or decreased depending upon the variation of bulk density within the "normal" range of 43 to 53 pounds per cubic foot, for example, as described above.

In this regard, oil has been taken as the primary control, as just noted. However, water could be taken as the primary control just as easily, with oil varied to maintain the rate of water addition within a predetermined desirable range. Oil has been taken as the primary control since coal typically includes quantities of water and typically is of too low a bulk density, requiring the addition of oil to raise the bulk density into a desired range.

PLOW DESIGN

As noted above, the present invention is directed to a plow for holding a source of radiation and acting upon a granular material. The design of the plow 19 (FIG. 1), which carries the radiation source 21, is particularly important to ensure that the coal or other granular material is properly handled for a correct determination of bulk density. The plow is shown in detail in FIGS. 2 and 4, and includes a front wedge-shaped portion 19a facing in the direction from which the granular material is supplied. The wedge-shaped front portion terminates in a forwardly extending prow 19b. The prow 19b essentially consists of a plate curved from upper part 19c of the forward end of the prow to lower part 19d of the rearward end of the prow. As granular material is applied to the plow, the material is divided by the prow 19b and the wedge-shaped forward plow portion 19a so that it passes smoothly to both sides of the plow. The curved part of the prow permits the material to pass easily underneath the plow so that radiation may pass downwardly through the material. It will be noted then that the plow serves the purpose of isolating a part of the granular stream of material which is of uniform thickness, i.e. in a dimension downwardly from the plow. The "thickness" is determined by the distance of the plow above the conveyor 15 conveying the granular material (distance $d$ in FIG. 4). It has been found that the curved prow 19b and the wedge-shaped plow portion 19a engage and properly direct the granular material without affecting the bulk density of the material by this action. Thus the plow permits accurate gaging of the material. Additionally, the design of the plow prevents foreign matter such as wire and the like from becoming caught on the plow.

FIGS. 2a and 2b show the interior of the plow 19 and container 31, illustrating the details of the mounting of the radioactive source 21. As shown in FIG. 2b, the radioactive source is carried on the end of a threaded rod 170 positioned inside a threaded tube 170a. The rod 170 is connected to a gear 172 driven by a worm 174 shown in FIG. 2a. The worm 174 is in turn driven by a motor 176. The motor is energized selectively to drive the worm 174 so as to raise and lower the radiation source 21 to a suitable position within the interior of the plow. The position of the radiation source determines the effective amount of granular material irradiated by the source, as will now be explained.

Lead or other shielding 178 is utilized within the plow 19 to contain the radiation from the source 21. A bottom piece 178a of the shielding is movable as shown by the arrows to the position shown in dashed lines. In the dashed line position of the bottom piece, radiation can pass downwardly from the source 21 through bottom plate 19e of the plow 19. Typically, the bottom plate 19e is of steel which does not deter the radiation from passing therethrough. The radiation source 21 is thus completely enclosed by lead shielding except therebelow following the positioning of the shielding piece 178a to the left in FIG. 2b. The opening in the shielding so provided acts as an effective lens to determine the divergence of the radiation "beam" from the source 21. Dashed lines 180a and 180b represent the effective maximum divergence of rays of energy from the source 21. The dashed lines are determined by drawing lines in FIG. 2b from the source 21 to the inside edges of the shielding at the opening provided by the block 178a moved to the left. It will be appreciated that, as the radiation source 21 is lowered, the radiation becomes more divergent as it passes through the bottom plate 19e; as the radiation source 21 is raised, the radiation becomes less divergent. Thus by controlling the position of the radiation source within the plow 19, the radiation can be made to irradiate a larger or a lesser portion of granular material, as desired.

Typically, the opening for radiation to pass through the bottom plate 19e of the plow (provided for by moving the block 178a to the left) is rectangular in shape. Any shape radiation opening can be provided in the shielding as desired for the purpose of irradiating the granular material. In any event, a uniform volume of material is irradiated once the position of the plow 19 is fixed above the conveyor 15 (determining the distance $d$ in FIG. 4), and the radiation source 21 is adjusted within the plow 19. For the purpose of calibration, it may be desirable periodically to insert a calibration plate (not shown) typically of lead and steel beneath the plow 19. The plate serves to simulate a quantity of granular material of standard bulk density. With the plate in position, the recorder pen of the bulk density recorder (not shown) in FIG. 3a should provide a particular indication corresponding to the standard bulk density simulated by the plate. If such an indication is not obtained, suitable adjustment of the radiation source 21 may be made until the correct indication is obtained.

SIMULATING THE FALL OF COAL IN A COKE OVEN

As explained above, the conveyor 13 is adjustable in height over the conveyor 15 (FIG. 1) so as to provide a drop of coal just prior to the determination of bulk density that simulates the drop in an oven. In this fashion, the coal is provided to the radiation source in a bulk density condition the same as that existing in the oven. This procedure is necessary to ensure correct bulk density control. Oftentimes it is impossible, however, to provide a drop the same as that in a coke oven, since the drop might be too great for a conveying system at a particular mill. Apparatus for carrying out one type of simulation is shown in FIGS. 2 to 4 and comprises a sled assembly 150 formed from a plurality of individual sleds 152. Six of such sleds are shown positioned across the conveyor 15, although this number is arbitrary. Each sled is carried by rods 154 pivotally secured thereto. The rods 154 are pivotally supported by support members 156 extending across and over the conveyor. The sleds 152 may have weights 158 positioned thereon. As shown in FIG. 3, the heights of the sleds 152 above the conveyor 15 may vary so that, in effect, the sled assembly assumes a general arcuate shape over the conveyor as viewed in a direction in line with the movement of the granular material on the conveyor.

The sled assembly as carried in the support members 156 is free to pivot in an arc generally in line with the movement of the granular material on the conveyor (see FIG. 4). The individual sleds of the sled assembly pivot in arcs and, in their engagement with the coal, cause the bulk density to be changed to simulate the drop of the coal in the coke ovens and the accompanying change in bulk density takes place there.

While the novel features of the invention have been illustrated and described in connection with a presently preferred embodiment, it is evident that others skilled in the art may apply the principles of the invention in other forms; such departures are contemplated by the claim.

We claim:

1. A plow for holding a source of radiation for acting upon a granular material, comprising a flat-bottomed housing for containing the source of radiation, said housing having a forwardly directed wedge-shaped and flat-bottomed front portion toward which the material is directed in a stream of material for dividing the material so that it passes on both sides of and underneath the housing, said wedge-shaped portion being forwardly terminated in a prow extending forwardly toward the material applied to the plow, said prow comprising a vertically disposed plate curved on a leading edge thereof from the upper part of its forward end down to the lower part of its rearward end to permit the material to pass by both sides of and underneath the housing.

* * * * *